May 4, 1954     M. TELKES     2,677,367
HEAT STORAGE UNIT
Filed April 25, 1951
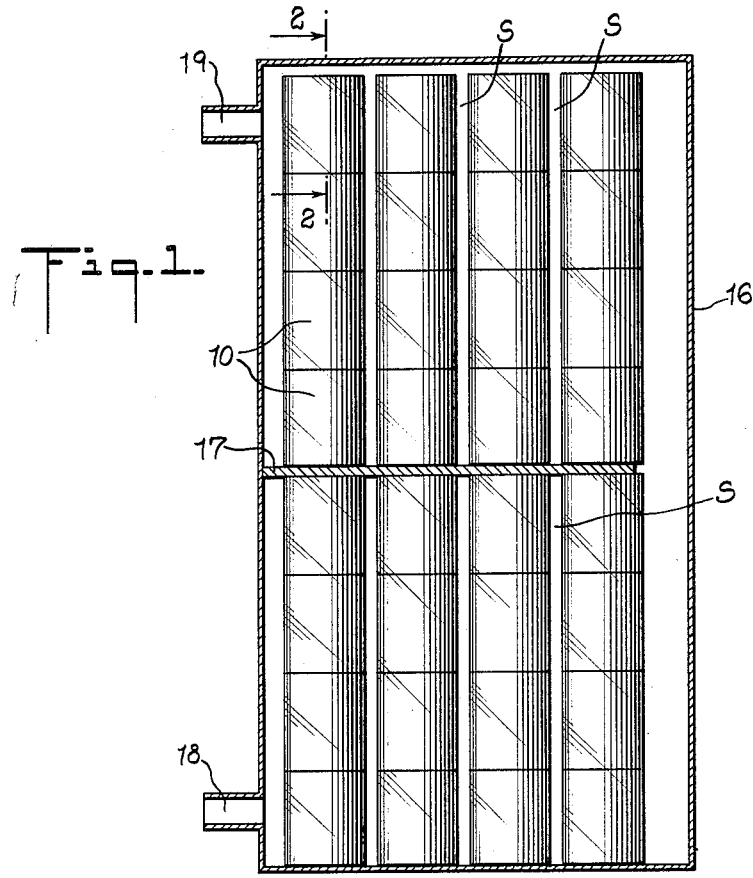
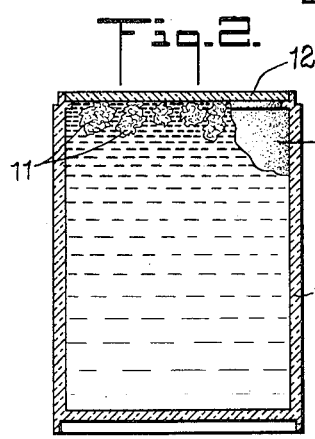
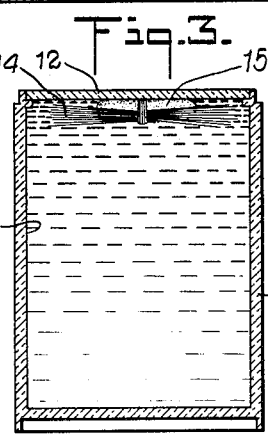
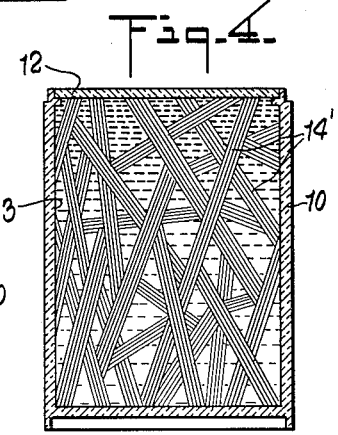
INVENTOR.
MARIA TELKES
BY
Kenyon & Kenyon
ATTORNEYS Patented May 4, 1954

2,677,367

UNITED STATES PATENT OFFICE 2,677,367

HEAT STORAGE UNIT

Maria Telkes, Cambridge, Mass.

Application April 25, 1951, Serial No. 222,886

13 Claims. (Cl. 126—263)

This invention relates to radiant energy heat storage devices and more particularly to such devices employing cells or bins containing compositions of matter for heat storage. This application is a continuation-in-part of my copending application Serial No. 693,787 filed August 29, 1946 now Patent No. 2,595,905 granted May 6, 1952.

My invention is applicable to the storage of solar heat, but is not limited thereto.

In the utilization of solar heat for heating purposes, heat collector means and heat storage means are necessary. The collector means comprises a radiant energy heat transfer device having at least one radiant energy transferring face adapted to absorb incident solar energy in the form of heat. The heat storage means includes a chemical heat storer. The heat storage means is adapted to receive heat from the collector and to deliver heat to a space the temperature of which is to be controlled.

In my copending application above mentioned I mention the use of disodium orthophosphate, $Na_2HPO_4$, as a heat storing material. Its particular value for this purpose is that it possesses a very high heat of fusion at a temperature which makes it available for space heating purposes. The heat of fusion of this salt is about 114 B. t. u. per pound at 96° F. Before my present invention this large heat storing capacity was not practicably or regularly available because of unaccountable variations in the crystallization of disodium orthophosphate as it gives up heat. While the salt might, at about 96° F. give up almost the full amount of its calculated heat content during one or two or three cycles of operation, the difficulty has been that sooner or later a cycle would be reached in which the salt would not crystallize properly and would give up only a part of the stored heat at the stated temperature, and in future cycles its performance would be unpredictable.

My present invention rests upon the discovery that disodium orthophosphate, on cooling from a higher temperature, may at about 96° F. crystallize into at least two hydrate forms, one the dodecahydrate, $12H_2O$, and another the septahydrate, $7H_2O$. These have differing solubilities in the ambient liquid, and the reasons why one or the other forms are not clear. I have found that if all the sodium orthophosphate can be caused to crystallize in the dodecahydrate form $(Na_2HPO_4.12H_2O)$ the full heat content can be extracted at around 96° F. To the extent, however, that the septahydrate forms, the heat is given up over a range of temperature extending well below 96° F. and only as much as one-third of the stored heat may be recovered. While solid disodium orthophosphate dodecahydrate crystals, introduced into the heat storing solution at the proper moment, would of course aid in bringing about the desired crystal formation, it is not feasible to introduce solid crystals into what must as a practical matter be a sealed container or unit.

According to my invention I incorporate in each sealed container of disodium orthophosphate a small amount of glass in such form or condition as to possess a relatively uneven surface area and preferably a calcium-containing glass presenting a large number of fractured or broken or chipped surfaces, with a substantial portion of these surfaces maintained in contact with the upper part of the disodium orthophosphate solution in each such container. Such glass serves to effectively promote the crystallization of the dodecahydrate without any substantial formation of the septahydrate. It does not melt under the incident solar heat and remains permanently in the container.

I have found that if the glass should settle entirely at the bottom of the container in which the heat storage mixture is contained it is no longer effective for the intended purpose. Hence I preferably use glass in such form or condition that a substantial portion of its fractured or broken or chipped surfaces are maintained in contact with the upper part of the solution.

Sodium orthophosphate dodecahydrate (also known as sodium acid phosphate or disodium phosphate) $Na_2HPO_4.12H_2O$ contains 39.6% by weight of $Na_2HPO_4$ and 60.4% by weight of water. I have found it much cheaper to prepare the heat storage material from the anhydrous salt $(Na_2HPO_4)$ and water than to use the dodecahydrate salt by itself.

A solution of the anhydrous $Na_2HPO_4$ containing less than 39.6% by weight of $Na_2HPO_4$ and to the lower limit of approximately 35% by weight of $Na_2HPO_4$ will store nearly the same amount of heat in a cubic foot as can be stored in a cubic foot containing 39.6% by weight of $Na_2HPO_4$. Hence the useful range of the $Na_2HPO_4$ content is from approximately 35% by weight to approximately 39.6% by weight of $Na_2HPO_4$ and the balance water.

The actual preparation of the heat storage medium containing the crystallization promoter is as follows.

Water is heated to about 96° F., and Na₂HPO₄ is added thereto in the percentages ranging approximately from 35% to approximately 39.6% by weight of the mixture and thoroughly dissolved therein by stirring or agitation. The Na₂HPO₄ may be of any commercial grade.

While Na₂HPO₄ is in itself not corrosive, it is desirable to include a corrosion inhibitor in some instances, particularly when using a metal container. Suitable corrosion inhibitors are sodium chromate, Na₂CrO₄ or sodium dichromate Na₂Cr₂O₇, either of which is added in the proportion of up to ½% by weight. If such corrosion inhibitors are to be added they are mixed and dissolved in the heated water prior to the addition thereto of the Na₂HPO₄. Other corrosion inhibitors can be used. It is essential that filling of the containers be carried on at temperatures above 96° F. to prevent partial crystallization which clogs or plugs the pipes used for filling purposes.

Instead of the above described mixtures of anhydrous disodium orthophosphate and water, I may use disodium orthophosphate dodecahydrate itself, with or without one of the said corrosion inhibitors. In this case, the dodecahydrate is prepared by simply heating it above its melting point of about 96° F. and, if desired, mixing the corrosion inhibitor with it. After this the molten material is filled into the containers, with the glass crystallization promoter, and the container sealed.

The glass crystallization promoter may be of various kinds. I have found particularly desirable a cellular glass which is described in United States patents to Ford Nos. 2,485,724 and 2,514,324. This material is made by admixing pulverized glass, or a natural mineral consisting largely of silica, with a gasing agent, such as carbon, and an oxygen generating agent (such as calcium sulphate) adapted to react with the carbon to generate gases, and heating the mixture until it sinters. The gases produced bloat the sintered mass. After cooling, the product is a cellular mass containing calcium and silica. Its density may be of the order of 10 or 20 lbs. per cu. ft., so that it floats freely on water. This material when broken into pieces, presents the multiplicity of fractured or chipped surfaces and sharp edges necessary to promote dodecahydrate crystallization when floating in a solution as above described of disodium orthophosphate.

I may also use glass wool, preferably containing calcium, as the crystallization promoter. This material is in the form of a mass or filaments of fibers with sharp pointed ends, the mass presenting a large uneven surface area. If used in small quantities, the glass wool may be bound in bundles to a float or the like which will supply the desired buoyancy.

In order that my invention may be better understood, attention is directed to the accompanying drawings forming a part of this specification and in which:

Fig. 1 is a partial elevation of a heat storage bin in which closed containers of the heat storage medium are arranged;

Fig. 2 is a vertical section of one of the containers taken along line 2—2 of Fig. 1 and illustrating one embodiment of my invention (part of the container being shown without its contents); and Figs. 3 and 4 are similar sections of modifications.

Referring to the drawings, Fig. 2 shows a heat storage unit employing cellular glass such as described above. The container 10 is substantially filled, as described above, with disodium orthophosphate and water, after which thimble-sized or smaller pellets 11 of the cellular glass with fractured surfaces are added. The cover 12 of the container is then sealed in place. A dozen or so pieces of cellular glass about the size of a pea will suffice for a gallon container.

The container 10 may be made of any suitable heat-conductive material, such as metal or glass. Where a glass container is employed, I have found that the crystallization of the disodium orthophosphate can be considerably promoted by making it of calcium-containing glass and roughening the interior of the container, as shown at 13 in Fig. 2. This roughening may be achieved in any suitable way as by etching or sandblasting. The roughened surface of the container acts to a degree like the fractured surfaces of the promoter 11. This kind of container may be used in all of the embodiments of my invention.

In the modification shown in Fig. 3, I have used, in place of the pellets 11, a mass of glass wool 14 preferably containing calcium. There is then obtained a glass mass with large surface area, which will produce an effect similar to that obtained with the pellets 11 of Fig. 2. The filaments of wool are preferably of unequal length and present an irregular mass with projecting points. To prevent this material from settling to the bottom of the container 10, it may be secured, as shown, to a float 15. This float may be a hollow calcium-containing glass body. Its outer surface may be roughened in the same manner as the interior of the container in Fig. 2, for the same purpose of promoting crystallization of the dodecahydrate. The float need not have a volume of more than a fraction (say one-third) of a cubic inch; and one such float will suffice for a gallon container.

In the embodiments of Figs. 2 and 3, the total volume of the glass material need not exceed 1% of the total volume of the container.

In Fig. 4, the calcium-containing glass wool forms a matrix 14′ which extends substantially throughout the interior of the container 10, so that it will not settle to the bottom. Except for the interstices between the glass wool filaments, the glass fills the container. The glass wool may be arranged in the containers before they are filled with the Na₂HPO₄ water solution. After the container is filled, it is closed and sealed.

I have found it most advantageous to fill and seal a plurality of individual containers 10 with the heat storing material and crystallization promoter and then to provide a plurality of tiers of such sealed containers, as shown in Fig. 1, in a bin 16 with direct heat transfer contact between the tops of containers of any tier and the bottoms of the containers in the tier at the next upper level. Small spacings s for circulation of air or other fluid between containers in each tier are provided. It is most advisable too, to provide large enough dimensions to the containers to allow for effective heat transfer thereto from the circulating air or other fluid about the containers. The containers may, for example, be about gallon size. A baffle 17 may be employed to prevent short circuiting of the air between the inlet and outlet ports 18 and 19.

It is also desirable and preferable to subject the containers, after they have been filled and sealed, to an elevated temperature on the order of the boiling point of water (212° F.), with agitation, for a considerable period of time sometimes as much as two hours, before they are put to use as a heat storage medium. This treatment appears beneficial in assuring the formation of dodecahydrate crystals and in suppressing formation of septahydrate crystals.

While I have described specific embodiments of the invention, variations in details thereof are possible and are contemplated. There is no intention, therefore, of limitation to the exact details described.

What is claimed is:

1. A heat storage unit consisting of a closed container having therein $Na_2HPO_4$, water and a crystallization promoter comprising glass with an uneven surface, the $Na_2HPO_4$ taken on an anhydrous basis being, by weight, between approximately 35% and 39.6% of the sum of the $Na_2HPO_4$ and water, and a substantial portion of the surface of the glass being maintained in contact with the upper part of the $Na_2HPO_4$ and water.

2. A heat storage unit as set forth in claim 1 in which the glass contains calcium.

3. A heat storage unit as set forth in claim 1 in which the glass has a specific gravity less than that of water.

4. A heat storage unit as set forth in claim 1 in which the glass is cellular and has a large number of uneven surfaces.

5. A heat storage unit as set forth in claim 1 in which the glass contains calcium, is cellular and has a large number of fractured surfaces.

6. A heat storage unit as set forth in claim 1 in which the glass is in the form of glass wool.

7. A heat storage unit as set forth in claim 1 in which the glass is glass wool and the unit includes a float by which the wool is carried.

8. A heat storage unit as set forth in claim 1 in which the glass is glass wool and the unit includes a float by which the wool is carried, the float having a roughened outer surface of glass.

9. A heat storage unit as set forth in claim 1 in which the glass is in the form of a matrix of spaced elongated elements.

10. A heat storage unit as set forth in claim 1 in which the glass is in the form of a matrix of glass wool substantially filling the container except for the interstices in the wool.

11. A heat storage unit as set forth in claim 1 in which the glass is in the form of a matrix of calcium-containing glass wool substantially filling the container except for the interstices in the wool.

12. A heat storage unit as set forth in claim 1 in which the container has therein a corrosion inhibitor.

13. A heat storage unit consisting of a closed container of calcium-containing glass having a roughened inner surface, said container having therein $Na_2HPO_4$, water and a crystallization promoter of cellular calcium-containing glass having a specific gravity less than that of water and having a large number of fractured surfaces, the glass being, by volume, not more than 1% of the contents of the unit, and the $Na_2HPO_4$ taken on an anhydrous basis being, by weight, between approximately 35% and 39.6% of the sum of the $Na_2HPO_4$ and water.

References Cited in the file of this patent

UNITED STATES PATENTS

| Number | Name | Date |
| --- | --- | --- |
| 708,549 | Heiliger | Sept. 9, 1902 |
| 1,203,776 | Paschal | Nov. 7, 1916 |
| 1,385,074 | Ferguson | July 19, 1921 |
| 1,433,010 | Hogan | Oct. 24, 1924 |
| 2,220,777 | Othmer | Nov. 5, 1940 |
| 2,289,425 | Hogan | July 14, 1942 |